No. 771,931. PATENTED OCT. 11, 1904.
H. A. POST.
THILL SUPPORT.
APPLICATION FILED JUNE 28, 1904.
NO MODEL.
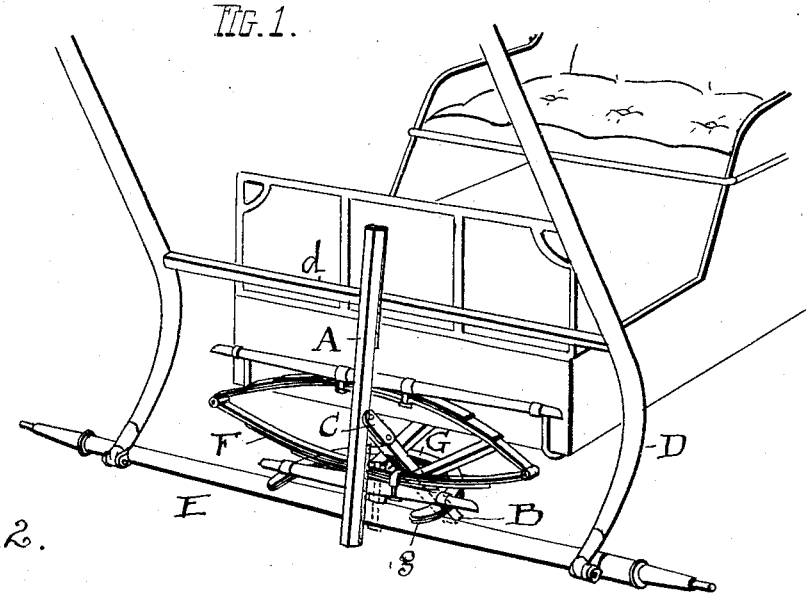
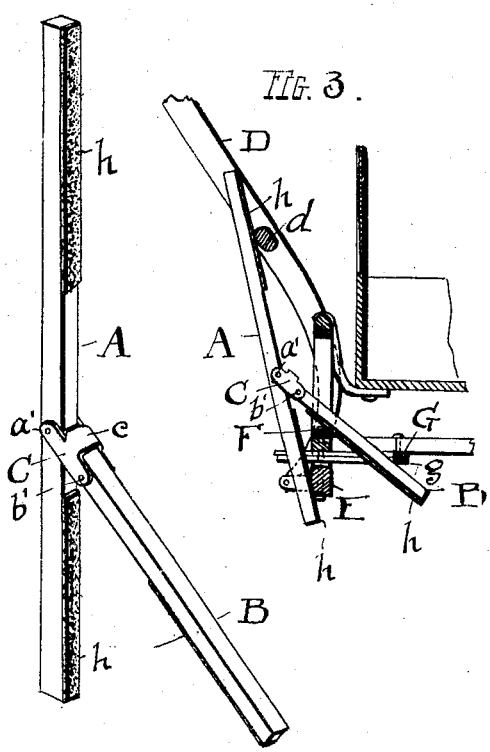
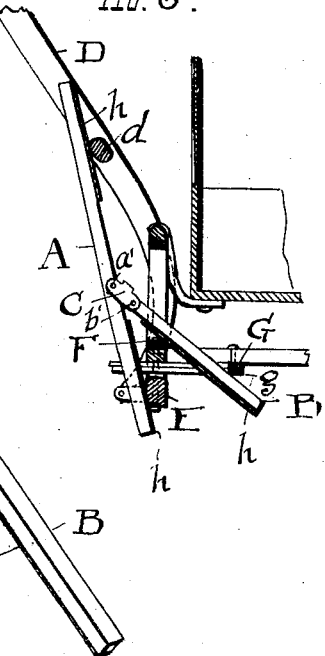
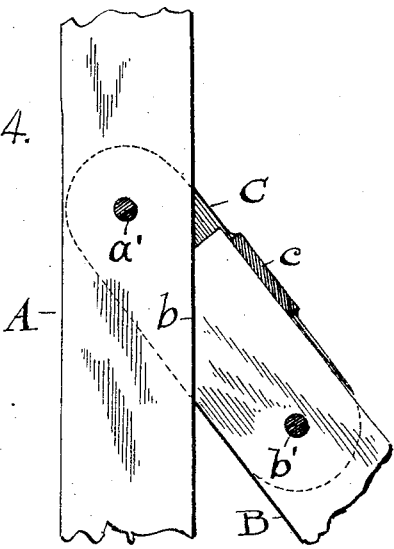
WITNESSES:
INVENTOR.
Harry A Post
BY
H. J. Fisher
ATTORNEY.

No. 771,931.

Patented October 11, 1904.

UNITED STATES PATENT OFFICE.

HARRY A. POST, OF PAINESVILLE, OHIO.

THILL-SUPPORT.

SPECIFICATION forming part of Letters Patent No. 771,931, dated October 11, 1904.

Application filed June 28, 1904. Serial No. 214,478. (No model.)

*To all whom it may concern:*

Be it known that I, HARRY A. POST, a citizen of the United States, residing at Painesville, in the county of Lake and State of Ohio, have invented certain new and useful Improvements in Thill-Supports; and I do declare that the following is a full, clear, and exact description of the invention, which will enable others skilled in the art to which it appertains to make and use the same.

My invention relates to a thill-support for buggies and other vehicles, all substantially as shown and described, and particularly pointed out in the claims.

In the accompanying drawings, Figure 1 is a perspective view of a buggy-front with the shafts or thills held in a raised position by my new support. Fig. 2 is a perspective view of the support itself, and Fig. 3 is a cross-section of the front of a vehicle with my support in working relation thereon. Fig. 4 is an enlarged sectional elevation of a portion of the supporting device in working position of parts.

I am of course aware that various devices have been developed first and last for holding up the thills of buggies, carriages, wagons, and other road vehicles, and some of such devices have been made in two or more parts and variously applied, according to their construction and purpose; but I do not know and do not believe that any one has ever before made or used a device having either the special construction or adaptation of the present invention.

My invention therefore consists in a support constituted, essentially, of three parts A, B, and C, constructed and pivotally connected substantially as shown. The primary part or member A is a straight stiff bar or piece of wood preferably of such length as will reach from the axle E to and across the cross-bar *d* of the thills or shafts D, and the said bar A is held firmly in an upright position by the doubly-pivoted fulcrum-arm B, engaged or resting at its bottom on the spring F directly over or upon the axle and at its outer end engaged beneath the lower member *g* of the fifth-wheel G. This makes the axle practically the fulcrum for the device, as the spring is bolted down thereon, as shown, and for these purposes the pivot or connecting member or part C is for the time made rigid with arm B through its bridge or cross portion *c*, which engages over the end of the said arm forward of its pivot, while the arm itself is beveled at *b* at an angle of nearly forty-five degrees where it impinges or rests against the edge of bar A. The said connecting or pivot part C is substantially H shape in plan, and its side portions are pivoted at one end on the sides of bar A and at *a'* and at the other end on the sides of arm B at *b'*, and the arm B can be turned into almost a completely-folded position against bar A, thus making a compact device for convenience in shipping.

A jointed arm is of material advantage in adjusting the device to different constructions of vehicles, and by reason of its location at the axial center of rotation the front axle and shafts may be freely turned in either direction while the said device is in its supporting position, which is an important advantage peculiar to this particular support, so far as I know and believe.

Any suitable covering *h*, of rubber, felt, or other like material, may be used here and there on the working surfaces of the device to protect the exposed surfaces from being marred.

The relation of the support to the several parts of the vehicle is most clearly seen in Fig. 3, wherein the primary supporting-bar A is shown as holding a substantially erect or vertical position in front of the vehicle as such and also of the cross-bar *d* of the thills, while the fulcrum-arm B rests down on the springs F and reaches in beneath the fifth-wheel at its free end. This secures or fixes the bar A in its upright position, and yet leaves the entire device free for easy removal when the thills are raised or pressed backward slightly for this purpose. As here shown, the arm B is pivotally connected with bar A between its ends and approximately at its lower middle portion, and if it be kept at the length needed this will always be the relation of the parts.

What I claim is—

1. In thill-supports, a support consisting of a supporting-bar and a fulcrum-arm and a double-sided pivot connection uniting said parts and having an integral cross portion between its sides substantially midway its length, substantially as described.

2. In thill-supports, a supporting-bar and a fulcrum-arm and a substantially H-shaped connection pivotally uniting said parts, and said arm having a beveled extremity bearing against said bar, substantially as described.

3. The support for thills consisting of a straight bar, a fulcrum-arm and a connecting member pivoted on the sides of said bar between its ends and on the sides of said arm back from its end and provided with a cross-connecting bridge above its pivot on said arm, and the end of said arm between the sides of said connecting member beveled to bear against the edge of the said bar, substantially as described.

4. A thill-support consisting of a supporting-bar and a fulcrum-arm and a substantially H-shaped member connecting said bar and arm, the cross portion of said H-shaped member extending over the end of said arm next to said bar and the said arm beveled across its inner corner between the pivots of said member on said bar and arm respectively, substantially as described.

In testimony whereof I sign this specification in the presence of two witnesses.

HARRY A. POST.

Witnesses:
R. B. MOSER,
C. A. SELL.